June 18, 1968  I. L. GLERUM  3,388,593
WIRE TENSIONING DEVICE
Filed June 4, 1965
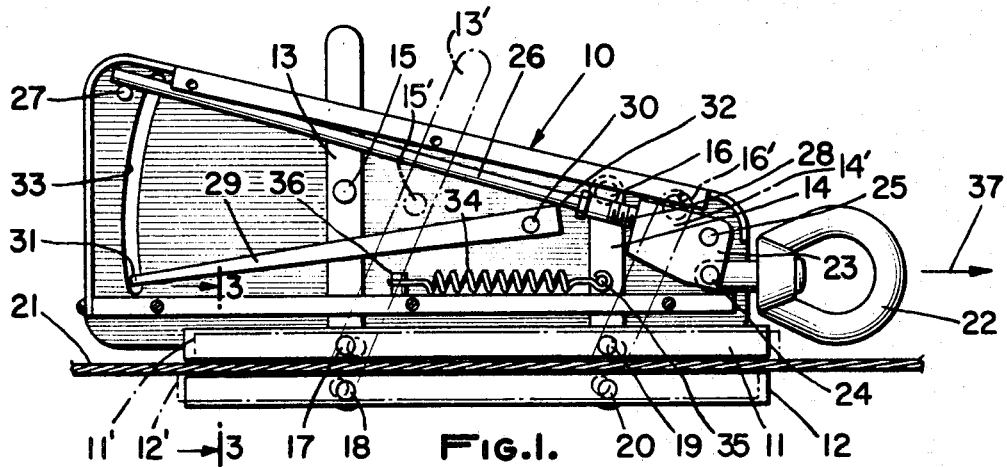
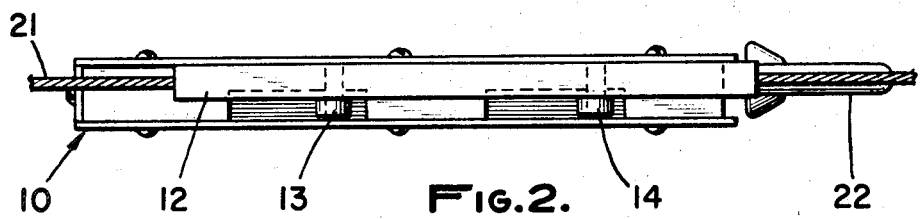
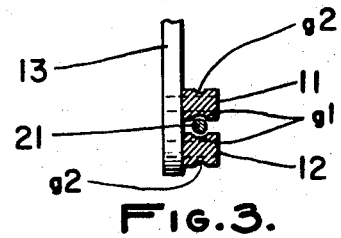
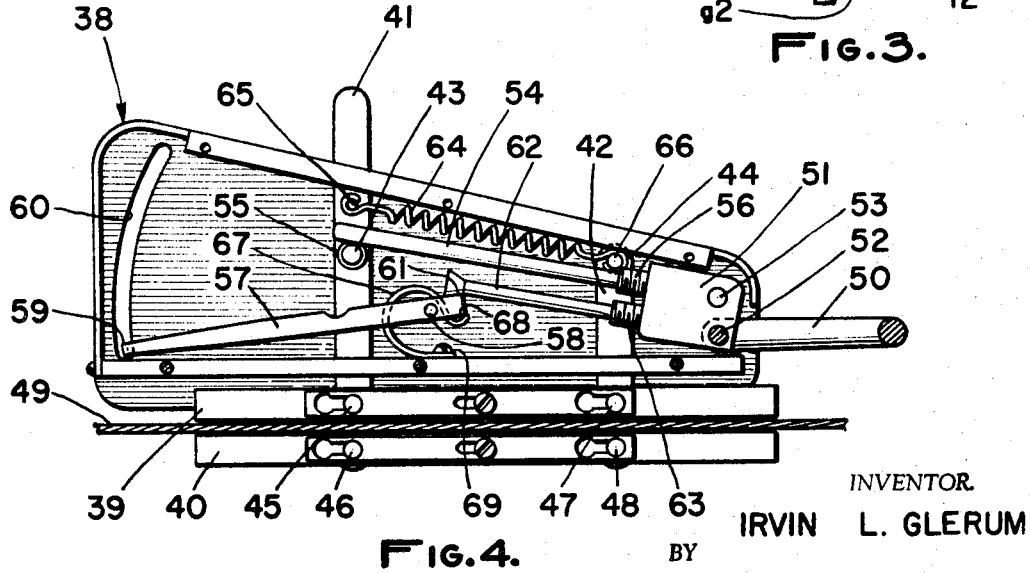
INVENTOR.
IRVIN L. GLERUM
BY
*Elliott & Pastoriza*
ATTORNEYS

United States Patent Office 3,388,593
Patented June 18, 1968

3,388,593
WIRE TENSIONING DEVICE
Irvin L. Glerum, Sherman Oaks, Calif., assignor to W. C. Dillon & Company, Inc., a corporation of California
Filed June 4, 1965, Ser. No. 461,425
7 Claims. (Cl. 73—143)

ABSTRACT OF THE DISCLOSURE

This disclosure relates to a wire gripping and tensioning device including parallel jaw members arranged in a parallelogram configuration for collapsing on opposite sides of a wire to grip the same. An indicator is provided which is secured to the frame structure and will indicate the tension force exerted when pulling a wire by the gripping jaws.

---

This invention relates generally to tensioning devices and more particularly to an improved combination tensioning and tension measuring device for tensioning wires.

In stringing wires and cables such as telephone wires, anchoring wires for towers, and the like, it is desirable to provide a device which is capable of gripping the wire at an intermediate portion as well as at the end to facilitate tensioning the wire. It is also desirable in many applications that an indication of the magnitude of the tensioning force be continuously provided during the tensioning operation in order to avoid exerting tension forces beyond the maximum limits for which the wire or cable is designed.

With the foregoing in mind, it is a primary object of this invention to provide an improved wire tensioning and tension indicating device in the form of a compact structure which may be easily secured to the wire at any desired intermediate point of the wire as well as to the end of the wire.

More particularly, it is an object to provide a wire tensioning device incorporating jaw members for gripping a wire therebetween so designed that the device may be slid along the wire in one direction and yet grip the wire when moved in a reverse direction so that a pulling force may be provided on the wire and the device then slid forwardly on the wire preparatory to applying another pulling force without having to remove the device from the wire.

Another important object is to provide a device for tensioning a wire in which the gripping action of the device on the wire increases with increased tension in the wire so that the risk of the wire slipping from the device during a tensioning operation is minimized.

Another object is to provide, in combination with a wire tension device meeting the foregoing objects, a novel indicating device wholly mechanically actuated as a consequence of the pulling force applied to the device to provide a continuous indication of the tension in the wire resulting from pulling on the device.

Other objects of this invention are to provide a device which is rugged and simple in design and thus relatively inexpensive to manufacture as compared to devices provided heretofore.

Briefly, these and many other objects and advantages of this invention are attained by providing a frame structure together with first and second jaw members. Preferably the jaw members are in the form of elongated gripping members disposed in parallel relationship and adapted to receive a given length of wire therebetween. Cooperating with the jaw members is a pivot means including first and second lever members having first ends pivoted to the frame and second end portions crossing the jaw members and respectively successively pivoted thereto to define a parallelogram shape with the jaw members. By this arrangement, forward movement of the jaw members relative to the frame causes the jaw members to move closer together as the parallelogram shape approaches a collapsed position. There is thus exerted a squeezing force which increases with increased forward movement of the jaw members.

A connecting means is coupled to the rear of the frame for providing a pulling force on the frame. Also provided is an indicating means coupled to the connecting means in such a manner as to provide an indication constituting a function of the pulling force on the connecting means.

With the foregoing arrangement, the device may be moved forwardly along a wire with the wire simply sliding between the jaw members. However, when a rearward force is exerted on the device the friction of the wire in the jaw members will tend to hold the jaw members stationary so that they will move forward relative to the frame with a consequent increased gripping action of the jaw members on the wire. This gripping action increases with increased tension resulting from a pulling force on the device in a rearward direction so that the entire wire may be tensioned to any desired degree within the tension limit of the wire itself.

The jaw members are designed so that the wire may be received therebetween from a lateral direction so that intermediate portions of the wire may be gripped as well as end portions. Further the jaw members are removably coupled to the frame so that they may be reversed to accommodate different wire sizes.

A better understanding of the invention as well as further features and advantages thereof will be had by now referring to specific embodiments as illustrated in the accompanying drawings, in which:

FIGURE 1 is a side elevational view of a first embodiment of the wire tensioning device of this invention;

FIGURE 2 is a bottom plan view of the device shown in FIGURE 1;

FIGURE 3 is a fragmentary cross-section taken in in the direction of the arrow 3—3 of FIGURE 1; and FIGURE 4 is another side elevational view of a modified embodiment of the invention.

Referring to FIGURE 1, the tensioning device includes a frame 10 below which are disposed first and second jaw members 11 and 12. These jaw members take the form of elongated bars disposed generally in parallel relationship and are coupled to the frame by means of first and second levers 13 and 14 also disposed in parallel relationship to each other and extending generally in a transverse or downward direction relative to the jaws 11 and 12.

As shown, the levers 13 and 14 are pivoted at first end portions as at 15 and 16 to the frame 10 and have their second or lower end portions respectively successively pivoted to bayonet type slots in the jaws 11 and 12 as at 17, 18, and 19, 20. These second end portions together with the intermediate portions of the jaw members 11 and 12 define a parallelogram shape with the pivot points 17, 18, 19, and 20 defining the vertices of the parallelogram. The levers 13 and 14 extend down the sides of the jaws, as best seen in FIGURE 2, so that the space between the jaws opens laterally upwardly from the plane of the drawing of FIGURE 1. A wire or cable 21 may thus readily be received between the jaws 11 and 12 with either an end portion or any intermediate portion between the jaws.

The inner opposing surfaces of the jaw members 11 and 12 may each be provided with a longitudinal groove such as indicated at $g1$ in FIGURE 3. This groove will engage opposite circumferential portions of the wire or cable 21 so that once the jaws grip the wire, it will be retained therebetween. The opposite surfaces of the jaws may also be provided with grooves as at $g2$ of different width from the grooves g1. By this arrangement, the jaws 11 and 12 may be reversed by uncoupling them through the bayonet slots so that the grooves g2 are in opposing relationship to accommodate a different sized wire.

With the structure described thus far, and with reference once again to FIGURE 1, it will be evident that if the jaws 11 and 12 are swung forwardly relative to the frame 10 so that the levers 13 and 14 pivot about the points 15 and 16 respectively, the jaw members 11 and 12 will move towards each other to grip the wire 21 as the parallelogram shape approaches a collapsed position. This is illustrated in FIGURE 1 where the jaws 11' and 12', levers 13' and 14' and pivot points 15' and 16' are shown in phantom lines corresponding to their positions when frame 10 has been moved to the right, as viewed in this figure, and cable 21 has remained stationary. The levers 13' and 14' having pivoted about points 15' and 16', the parallelogram defined by jaws 11' and 12' and the lower end portions of levers 13' and 14', will be substantially collapsed. Further, it will be evident that the greater the forward movement of the jaws 11 and 12 relative to the frame 10 the closer will the jaws be brought together so than an increase in the pulling force on the jaws by the wire will increase the gripping action of the jaws.

Referring still to FIGURE 1, the rear portion of the frame 10 is provided with a connecting means including an eye 22 coupled to the frame 10 through the medium of a block member 23. The eye member 22 is pivoted to the block member 23 at a point 24 and the block member in turn is pivoted to the frame 10 at a point 25. The pivot points 24 and 25 are out of alignment with respect to the direction of the pulling force exerted on the connecting eye 22 so that the block 23 will tend to rotate about the pivot point 25 when pulling forces are applied.

By mounting the block 23 as described, and by applying a suitable reaction or opposing force opposing the tendency of the block 23 to rotate in response to a tension force on the eye 22, it is possible to provide an indication of the tension force. Towards this end, there is provided an elongated bending beam 26 within the frame 10 with its far end engaging a stop pin 27 connected to the frame. The near end of the bending beam 26, in turn, is threadedly coupled to the block 23 as at 28. The threaded coupling 28 is in the form of an internally double end threaded collar which may be rotated to vary the length of the portion of the beam subjected to a bending moment. For example, threading of a collar 28 in a first direction will move the bending beam 26 further away from the block 23 so that its far end overhangs the stop pin 27 a greater extent than shown. Similarly, threading the collar 28 in an opposite direction will move the far end of the beam 26 to the right as viewed in FIGURE 1, thereby increasing the effective length of the beam subject to bending. By this adjustment, the reaction force exerted by the bending beam opposing rotation of the block 23 about the pivot 25 in response to tension forces may be adjusted.

An indicating means including an indicating pointer 29 is pivoted to the frame 10 as at 30. The left end portion of the pointer 29 terminates in a point 31 and the opposite end extends to the right of the pivot 30 in a position to be engaged by the bending beam 26 as at 32. By this arrangement, a small bending of the beam 26 will result in a relatively large swinging of the free end point 31 of the indicator 29. A suitable scale may be provided along an arcuate slot 33 in the frame so that the extent of swinging movement of the indicator 29 will provide a reading on the scale indicative of the tension applied tending to rotate the block 23.

The assembly is completed by the provision of a biasing means in the form of a coiled spring 34 secured at one end 35 to the lever member 14 and having its other end 36 secured to the frame 10. This spring exerts a force tending to swing the lever member 14 towards the left, as viewed in FIGURE 1, to cause the jaws 11 and 12 to swing in a forward direction thus maintaining a grip on the wire 21 in the absence of any tension applied to the device. This gripping action resulting from the spring 34 may readily be overcome by simply pushing the upper exposed end of the lever member 13 forwardly to swing its lower end backwardly relative to its pivot 15. It will be clear from the dotted and solid line positions illustrated in FIGURE 1 that this latter motion tends to move the jaws in a rearward direction so as to cause the parallelogram shape to approach that of a rectangle thus widening the space between the jaw members 11 and 12 and permitting a wire to be very easily inserted or released.

From the foregoing description of the device, its operation will be clear. Initially, an end or intermediate portion of a wire or cable such as the wire 21 is inserted between the jaws 11 and 12. To facilitate this insertion, the operator of the device may move the lever 13 forwardly from the dotted line position to its solid line position to open the jaws to maximum extent. This operation may be carried out with the same hand that is holding the device and the operator may use his other hand to slip the wire between the jaws. The operator may then release the lever so that the spring 34 causes the jaws to move forwardly until their opposed interior surfaces grip the wire 21.

With the wire positioned between the jaws as described, the operator may very easily slide the entire device forwardly along the wire with the wire 21 moving to the right between the jaw members with ease since movement in this direction tends to swing the jaw members to the right or rearwardly as viewed in FIGURE 1 and thus separate their opposing surfaces. However, if a pulling force is exerted on the device such as in the direction of the arrow 37 by means of a tensioning machine applied to the eye 22, the jaws 11 and 12 will move forward relative to the frame 10 in such a manner as to cause them to tightly grip the wire.

To tension the wire, increased force is exerted on the eye 22 in the direction of the arrow 37. This tension force, because of the out-of-alignment mounting of the pivot points 24 and 25 for the block member 23, will cause the block member 23 to rotate in a counterclockwise direction about the pivot point 25 as viewed in FIGURE 1. This action, in turn, is opposed by the bending beam 26 which will deflect or bend under this rotational force. The beam, in bending, will thus cause the indicating pointer 29 to rotate about its pivot point 30 as a consequence of its engagement with the righthand end of the pointer as at 32. The deflection of the beam will increase with increasing tension so that the pointer 29 will have its indicating end 31 move up along the scale 33 with increasing tension. The scale itself may be calibrated directly in pounds of force so that a direct reading of the tension in the wire may be obtained at any time simply by observing the position of the pointer end 31 relative to the scale 33.

As described heretofore, the reaction force exerted by the beam 26 may be varied by varying the effective length of the beam subjected to bending. This adjustment as described can be effected by rotating the threaded collar 28 to move the beam in a position with a greater portion overlapping the stop pin 27 or a lesser portion depending upon whether it is desired to increase the opposing force to rotation of the block member 23 or decrease such force.

Referring now to FIGURE 4, there is shown a modified tensioning device which operates in a manner similarly to that in FIGURE 1. Thus, there is provided a basic frame 38 coupled to jaw members 39 and 40 by means of levers 41 and 42. These levers are pivoted to the frame 38 as at 43 and 44 and have their second ends respectively successively pivoted to the jaw members 39 and 40 as at 45, 46, and 47, 48 to again define a parallelogram-like shape. A cable or wire 49 is received between the jaw members. The elements described thus far are substantially the same as the corresponding elements described in conjunction with FIGURE 1.

In the embodiment of FIGURE 4, there is provided a connecting means in the form of an eye 50 pivoted to a block 51 as at 52. The block 51, in turn, is pivoted at 53 to the frame 38, the pivot points 52 and 53 being out of alignment with the general direction of tension force applied to the device.

The tendency for the block 51 to rotate as a consequence of such tensioning force is countered by an opposing reaction force generated by means of a beam 54 passing over a stop pin 55 which may be coaxial with the pivot point 43 for the lever 41. The near end of the bending beam 54 is coupled to the block member 51 by a double internally threaded collar 56 so that again the effective length of the beam subjected to bending forces may be varied.

An indicator including a pointer 57 is pivoted to the frame 38 as at 58 and has its far left indicating end 59 juxtaposed a suitable scale 60. The opposite end of the indicator 57 to the right of the pivot point 68, in turn, is arranged to be engaged as at 61 by an actuating rod 62. This actuating rod is threaded within the block 51 as at 63 at a portion of the block spaced from the threaded connection of the bending beam 54.

The assembly is completed by a tension spring 64 having one end 65 connected to the lever 41 and its other end 66 connected to the frame 38 through the medium of the pivot 44 to provide a forward biasing force on the jaw members. Also provided is a small hair spring 67 connected to the pointer 57 as at 68 and to the frame as at 69. This hair spring exerts a counterclockwise rotational bias on the pointer 57 so as to hold its righthand end portion 61 in engagement with the end of the actuating rod 62.

From the above description, it will be evident that the embodiment of FIGURE 4 is very similar to FIGURE 1. The difference resides in the means for actuating the pointer 57. In FIGURE 4, this means takes the form of the rod 62 which will serve to move the pointer 57 in opposition to the biasing force on the pointer exerted by the hair spring 67 when the block 51 rotates about the pivot point 53. By this arrangement, the movement of the pointer 57 is independent of the manner in which the beam 54 should bend. In addition, by adjusting the extent of the actuating rod 62 from the block 51 by means of the threaded adjustment 63, it is very easy to adjust the distance through which the pointer will move with respect to a given rotational distance of the block 51 without in any way affecting the overall effective length of the bending beam 54.

Other than the foregoing noted modifications, the device of FIGURE 4 operates in a manner identical to the device of FIGURE 1.

From the foregoing description, it will thus be evident that the present invention has provided a greatly improved tensioning device in combination with a tension indicator. The entire structure is relatively compact and may be held in one hand of the operator with his thumb employed to actuate the first lever 13 in the case of FIGURE 1 or the lever 41 in the case of FIGURE 2 to facilitate engaging and releasing the wire between the jaw members. Further, the device may very easily be slipped along the wire in a forward direction as described heretofore.

Various changes and equivalent structures as fall clearly within the scope and spirit of this invention will occur to those skilled in the art. The tensioning and tension measuring device is therefore not to be thought of as limited to the exact embodiment set forth merely for illustrative purposes.

What is claimed is:

1. A wire tensioning and tension measuring device comprising, in combination: a frame; first and second substantially parallel jaw members adapted to receive a wire therebetween; first and second parallel support levers pivoted to said frame at first end portions and extending in a transverse direction towards said jaw members, said support levers having second end portions pivoted to said jaw members to define therewith a parallelogram so that forward movement of said jaw members brings them closer together as said parallelogram approaches a collapsed position to thereby exert a squeezing force on a wire; connecting means for exerting a pulling force on said frame in a rearward direction; a block member pivoted to the rear portion of said frame and coupled to said connecting means at a point out of alignment with the direction of said pulling force so that said block tends to rotate in response to a pulling force; a bending beam secured at a first end to said block and engaging a stop pin on said frame at its other end so that rotation of said block is opposed by bending reaction force in said beam; and an indicating pointer pivoted to said frame in a position for movement an amount constituting a function of the degree of rotation of said block thereby providing an indication of the pulling force exerted on said connecting means.

2. A device according to claim 1, including means for adjusting the length of the bending portion of said beam between said block and said stop pin to vary the range of movement of said pointer over a given force range.

3. A device according to claim 1, in which each of said jaw members have grooves of different widths on their opposite surfaces, said jaw members being removably coupled to said second end portions whereby they may be removed and reversed so that different ones of said grooves are positionable in opposing relationship to accommodate different wire sizes.

4. A device according to claim 1, including a biasing means connected between one of said levers and said frame urging said jaw members forwardly.

5. A device according to claim 1, in which said pointer is positioned to be engaged directly by a portion of said beam so that its movement constitutes a function of the degree of bending of said beam.

6. A device according to claim 1, including an elongated actuating member having one end secured to said block and its other end adapted to engage said pointer to move said pointer in response to rotation of said block.

7. A device according to claim 6, including a biasing means biasing said pointer into engagement with said other end of said actuating member.

References Cited

UNITED STATES PATENTS

| 645,519 | 3/1900 | Bracewell | 73—143 |
| 1,249,118 | 12/1917 | Klofkorn | 73—143 |
| 2,002,977 | 5/1935 | Carr | 73—143 |
| 2,687,642 | 8/1954 | Livermont. | |
| 3,193,897 | 7/1965 | Angquist. | |
| 633,632 | 9/1899 | Wilson | 73—143 |
| 1,117,874 | 11/1914 | Main. | |
| 1,305,780 | 6/1919 | Dilks | 73—143 |
| 1,591,344 | 7/1926 | Reeves. | |
| 2,490,773 | 12/1949 | Black | 73—143 |

FOREIGN PATENTS 1,267,489  6/1961  France.

RICHARD C. QUEISSER, Primary Examiner.

JAMES J. GILL, Examiner.

JAMES H. WILLIAMSON, Assistant Examiner.